United States Patent
Bohner et al.

(10) Patent No.: US 6,283,243 B1
(45) Date of Patent: Sep. 4, 2001

(54) METHOD FOR OPERATING A VEHICLE STEERING SYSTEM

(75) Inventors: Hubert Bohner, Boeblingen; Mathias Hartl, Kernen; Reinhold Schneckenburger, Rutesheim, all of (DE)

(73) Assignee: DaimChrysler AG, Stuttgart (DE)

( * ) Notice: Subject to any disclaimer, the term of this patent is extended or adjusted under 35 U.S.C. 154(b) by 0 days.

(21) Appl. No.: 09/397,732

(22) Filed: Sep. 17, 1999

(30) Foreign Application Priority Data

Sep. 17, 1998 (DE) .............................. 198 42 624

(51) Int. Cl.⁷ ...................................... B62D 5/30
(52) U.S. Cl. ................... 180/406; 180/421; 180/419; 180/402
(58) Field of Search .................... 180/402, 403, 180/421, 406, 419

(56) References Cited

U.S. PATENT DOCUMENTS

| | | | |
|---|---|---|---|
| 4,558,759 | * 12/1985 | Baatrup et al. | 180/132 |
| 4,798,256 | * 1/1989 | Fassbender | 180/133 |
| 5,247,441 | * 9/1993 | Serizawa et al. | 364/424.05 |
| 5,251,135 | * 10/1993 | Serizawa et al. | 364/424.05 |
| 5,347,458 | 9/1994 | Serizawa et al. | 364/424.05 |
| 5,347,942 | * 9/1994 | Serizawa et al. | 364/424.05 |
| 5,579,863 | * 12/1996 | Nelson et al. | 180/418 |
| 5,862,878 | * 1/1999 | Bohner et al. | 180/403 |
| 5,896,942 | * 4/1999 | Bohner et al. | 180/402 |
| 6,041,882 | * 3/2000 | Bohner et al. | 180/402 |
| 6,076,626 | * 6/2000 | Bohner et al. | 180/402 |
| 6,152,254 | * 11/2000 | Phillips | 180/422 |
| 6,176,341 | * 1/2001 | Ansari | 180/402 |

FOREIGN PATENT DOCUMENTS

WO 90/12724   11/1990  (WO) .

* cited by examiner

*Primary Examiner*—J. J. Swann
*Assistant Examiner*—J. Allen Shriver
(74) *Attorney, Agent, or Firm*—Crowell & Moring, L.L.P.

(57) ABSTRACT

A way is provided to simulate the steering handle manual torques which correspond to a steering stop of the steered vehicle wheels for a vehicle steering system which can be operated in a normal mode and in an emergency mode. The steering system is capable of being switched between a steer-by-wire level assigned to the normal mode, on which level a steering handle is connected to steered vehicle wheels via an electric or electronic control system, and a fall-back level assigned to the emergency mode, on which level the steering handle is positively coupled mechanically and/or hydraulically to the steered vehicle wheels. The fall-back level is activated in normal mode if the steered vehicle wheels are displaced into the region of the steering stop.

15 Claims, 1 Drawing Sheet

METHOD FOR OPERATING A VEHICLE STEERING SYSTEM

CROSS REFERENCE TO RELATED APPLICATION

This application is related to application Ser. No. 09/396,409 filed on Sep. 15, 1999 in the name of Hubert Bohner et al. for Steering System For A Vehicle and Ser. No. 09/397,731 filed on Sep. 17, 1999 in the name of Hubert Bohner et al. for Steering System For A Vehicle.

BACKGROUND OF THE INVENTION

This application claims the priority of 198 42 624.0-21, filed Sep.17, 1998, the disclosure of which is expressly incorporated by reference herein.

The present invention relates to a method for operating a vehicle steering system which can be operated in a normal mode and in an emergency mode. The system can be switched between a steer-by-wire level assigned to the normal mode, and a fall-back level assigned to the emergency mode. In this arrangement, a steering handle, e.g. steering wheel, which can be actuated by the driver is connected via an electric or electronic control system to steered vehicle wheels. On the fall-back level, the steering handle is positively coupled mechanically and/or hydraulically to the steered vehicle wheels.

In a steering system which can be operated in a steer-by-wire mode or level, the steering handle generally actuates a desired steering-angle transmitter, while the steered vehicle wheels actuate an actual steering-angle transmitter. Such a steering system also has a control unit which carries out a comparison between the desired values and the actual values. As a function thereof, a steering-angle actuator, e.g. a servomotor, is actuated and, in turn, actuates the steered vehicle wheels.

On the steer-by-wire level of the steering system, the steering handle operates without being positively coupled to the steered vehicle wheels. Therefore, it is not possible for the driver to notice side forces acting on the steered vehicle wheels. In particular, the driver cannot tell when the steered vehicle wheels have reached a steering stop with a maximum steering lock.

U.S. Pat. No. 5,347,458 discloses a steer-by-wire steering system for a vehicle, which has a manual-torque actuator which actuates a steering handle in order to simulate at the wheel side forces acting on the steered vehicle wheels. The driver is thereby given steering feedback which corresponds essentially to the steering feedback obtained with a steering system that has positive coupling between the steering handle and the steered vehicle wheels. This improves the "feel" that the driver obtains during driving and the steering stability of the vehicle because the driver receives information on the current driving situation via the side forces that can be felt at the steering handle.

In this context, it is problematic when the steered vehicle wheels are displaced as far as the steering stop since extreme forces or moments at the steering handle must be simulated in order to impart the sense of the steering stop. For example, an electric motor used as a manual-force actuator must be very large to provide the moments required to simulate the steering stop.

SUMMARY OF THE INVENTION

An object of the present invention is to provide a way in a vehicle steering system of imparting the impression of steered vehicle wheels displaced as far as the steering stop by simple measures on the steer-by-wire level or mode.

According to the present invention, this object has been solved by a method in which a steering handle, e.g. steering wheel, is connected to steered vehicle wheels via an electric or electronic control system, and a fall-back level assigned to the emergency mode, on which level the steering handle is positively coupled mechanically and/or hydraulically to the steered vehicle wheels, characterized in that the fall-back level is activated in normal mode if the steered vehicle wheels are displaced into the region of a steering stop.

The invention is based on the recognition of exploiting the positive coupling between the steering handle and the steered vehicle wheels on the fall-back level for the purpose of transmitting the steering stop to the steering handle. According to the invention, this purpose is served by activating the fall-back level when the steered vehicle wheels reach the steering stop or reach steering angles in the vicinity of the steering stop, because the side forces acting on the steered vehicle wheels at the steering stop can be felt directly at the steering handle by way of the positive coupling that is then present, i.e. the steering handle cannot be actuated further without a considerably greater expenditure of force. Although large forces or moments can then be felt at the steering handle, the manual-torque actuator is subject to no load whatsoever and can therefore be made considerably smaller and cheaper.

The features according to the invention are implemented without a high outlay on design. It is, for example, sufficient to specify a new switching criterion for the steering-system control system that initiates switching to the fall-back level when the steer-by-wire level malfunctions. This criterion is namely the reaching of the steering stop by the steered vehicle wheels.

According to a currently preferred embodiment, the fall-back level should be activated in such a way that it is added to the active steer-by-wire level. This means that the control and regulation efforts required, for example, when the steered vehicle wheels reach the steering stop for only a relatively short time are particularly small.

In another embodiment of the method according to the present invention, the fall-back level is deactivated again as soon as a steering command input into the steering system via the steering handle no longer actuates the steered vehicle wheels against the steering stop reached but in a direction away from the steering stop. It is likewise possible for the deactivation of the fall-back level to take place when there is no longer any steering actuation of the steering handle. These measures are worthwhile particularly if, for the purpose of forming a transition zone, the fall-back level is activated before the steered vehicle wheels have even reached the steering stop and are only at a steering angle in the vicinity of the steering stop.

The method proposed by the present invention is of particular significance when the steer-by-wire level has a variable steering-angle transmission system, in which the actuation of the steered vehicle wheels brought about by the actuation of the steering handle depends on at least one vehicle operating parameter. For example, a quarter turn of a steering handle can be assigned a relatively small change in the steering angle at the steered vehicle wheels at high vehicle speeds, while the same quarter turn of the steering handle brings about a relatively large change in the steering angle at the steered vehicle wheels at low speeds, e.g. when manoeuvring. It is readily apparent from the foregoing that, with a variable steering-angle transmission ratio, the steered vehicle wheels reach their steering stop after steering actuations of different magnitude of the steering handle, depending on the current transmission ratio. The method proposed by the present invention ensures that the steering stop can be felt directly at the steering handle, whatever the transmission ratio.

To preserve the electric-motor manual-torque actuator when the steering stop is reached, the actuator can expediently be deactivated when the fall-back level is activated.

BRIEF DESCRIPTION OF THE DRAWINGS

Other objects, advantages and novel features of the present invention will become apparent from the following detailed description of the invention when considered in conjunction with the accompanying drawings.

The sole FIGURE is a schematic representation of a steering system that can be operated by the method according to the invention.

DETAILED DESCRIPTION OF THE DRAWINGS

Figure 1:
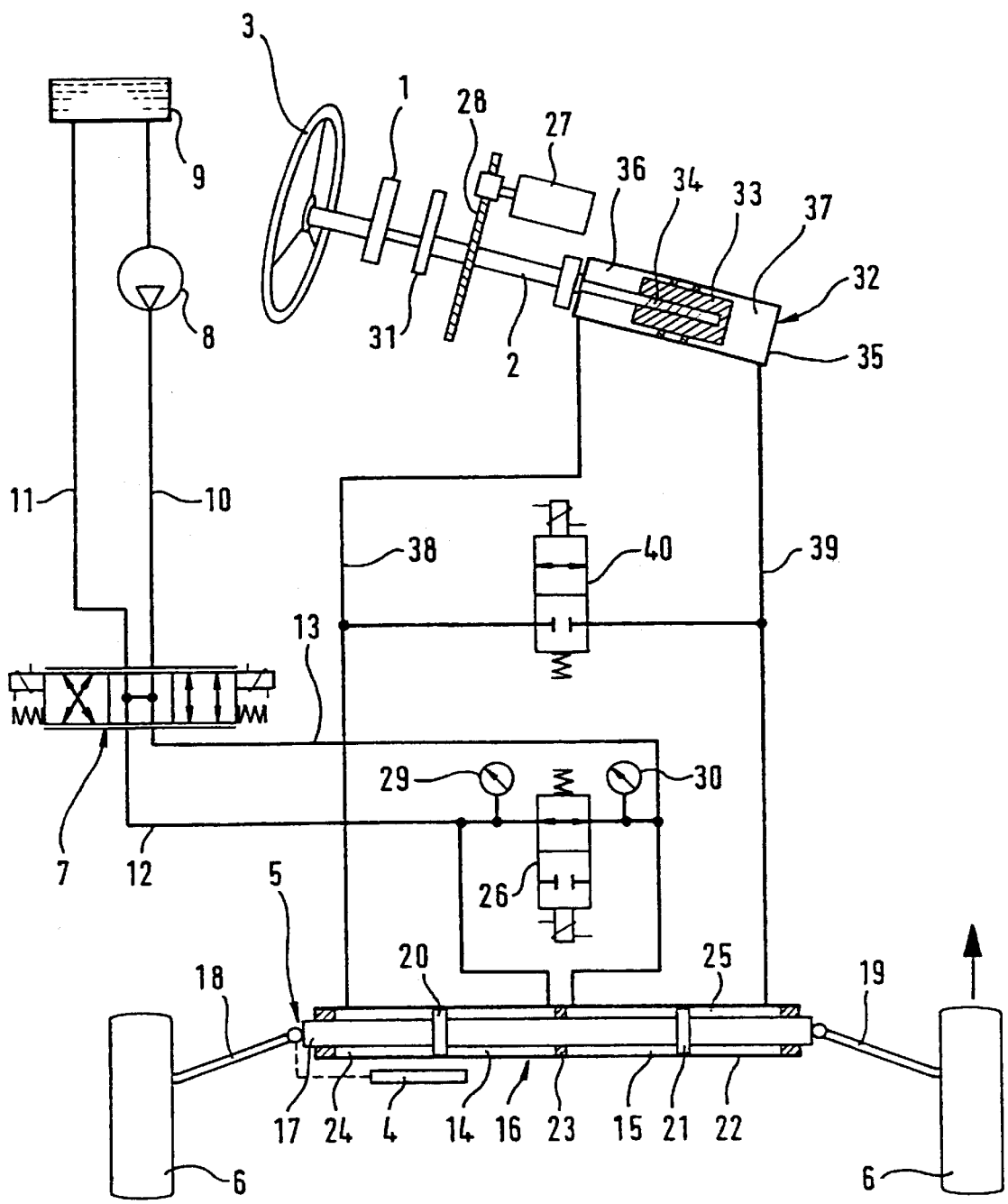

According to the drawing, a steering system of a vehicle has a steer-by-wire level for a normal mode and a fall-back level for an emergency mode. In the embodiment illustrated, the steer-by-wire level of the steering system has a desired steering-angle transmitter 1, which is fixedly connected for rotation in common to a steering column 2 which, for its part, is fixedly connected for rotation in common to a steering handle 3 configured as a steering wheel. The desired steering-angle transmitter 1 is thus actuated by the steering handle 3. The steer-by-wire level furthermore has an actual steering-angle transmitter 4, which is coupled to a steering linkage 5 which, for its part, is positively coupled to steered vehicle wheels 6. Actuating the steering linkage 5 thus leads to a corresponding steering actuation of the steered vehicle wheels 6. Due to the positive coupling of the steering linkage 5, displacements of the steered vehicle wheels 6 also actuate the actual steering-angle transmitter 4.

The steer-by-wire level furthermore contains a known type of control unit which carries out a comparison between the desired and the actual values of the steering angles and actuates a control valve 7 as a function thereof. On one hand, the control valve 7 is connected by a low-pressure line 11 to a hydraulic-fluid reservoir 9 and by a high-pressure line 10 to the delivery side of a hydraulic pump 8, the inlet side of which is likewise connected to the hydraulic-fluid reservoir 9. On the other hand, the control valve 7 is connected by a left-hand connection line 12 and a right-hand connection line 13 to two chambers 14, 15 of a piston-cylinder unit 16 which serves as a servomotor or steering-angle actuator.

The piston-cylinder unit 16 has an axially continuous piston rod 17 which forms part of the steering linkage 5 and is connected at its axial ends to steering rods 18, 19 which form the other parts of the diagrammatically represented steering linkage 5 for the steering actuation of the vehicle wheels 6. The piston rod 17 carries two axially spaced pistons 20, 21 which can be displaced axially in a cylinder 22 of the piston-cylinder unit 16 by the piston rod 17. A dividing wall 23 penetrated by the piston rod 17 is secured in the cylinder 22 between the pistons 20, 21. In the cylinder 22, the pistons 20, 21 and the dividing wall 23 separate the two chambers 14, 15 and two further chambers 24, 25 axially from one another.

The chambers 14 and 15 can be hydraulically relieved by a safety valve 26 which, in the illustrated deenergized position, short-circuits the two hydraulic connections 12, 13 of the respective chambers 14, 15 for emergency operation. In the other position of the safety valve 26, this short-circuit connection between the two hydraulic connections 12, 13 is shut off for normal operation.

To simulate manual torques at the steering handle 3, the steer-by-wire level has a manual-torque actuator 27, which is connected by way of a gear 28 to the steering column 2, and in this way is coupled to the steering handle 3. A known type of control unit determines the side forces acting on the steered vehicle wheels 6, for example by way of pressure sensors 29, 30 each communicating with one of the hydraulic connections 12, 13 because the side forces lead to the transmission of an axial force via the steering linkage 5 to the piston rod 17. This axial force in turn leads to a pressure difference in the chambers 14, 15 and thus in the associated hydraulic connections 12, 13.

From the side forces or from the correlated pressure difference between the pressure sensors 29, 30, the control unit assigned to the manual-torque actuator 27 determines a desired value for a manual torque that it should be possible to feel at the steering handle 3 in order to simulate these side forces. The steering column 2 is also acted upon by an actual manual-torque transmitter 31 which allows the abovementioned control unit to regulate the manual-torque actuator 27 by way of a corresponding comparison between the desired values and the actual values of the manual torques.

The fall-back level of the steering system has a manual-side piston-cylinder unit 32. The piston 33 of the unit 32 interacts with an axial end or continuation 34 of the steering column 2, the end or continuation being a spindle drive. By virtue of this coupling, a rotary displacement of the steering handle 3 and hence of the steering column 2 leads to an axial displacement of the piston 33 in a cylinder 35 of the piston-cylinder unit 32. In the cylinder 35, the piston 33 separates two chambers, a left-hand chamber 36 and a right-hand chamber 37. The chambers 36, 37 communicate via hydraulic lines, a left-hand hydraulic line 38 and a right-hand hydraulic line 39, with corresponding chambers of a wheel-side piston-cylinder unit.

In the illustrated embodiment, the wheel-side piston-cylinder unit is formed by the piston-cylinder unit 16, which also serves as the servomotor of the steer-by-wire level. In this arrangement, the axially inner chambers 14, 15 are assigned to the steering-angle actuator or servomotor of the steer-by-wire level, while the axially outer chambers 24, 25 are assigned to the piston-cylinder unit of the fall-back level.

The left-hand hydraulic line 38 and the right-hand hydraulic line 39 are connected to another safety valve 40, which, in the illustrated deenergized position, decouples the two hydraulic lines 38, 39 hydraulically from one another for emergency operation. In the other position, however, the two hydraulic lines 38, 39 are connected to one another so as to communicate via the safety valve 40 for normal operation.

In the normal mode, the steer-by-wire level of the steering system is activated, for which purpose the safety valve 26 is switched to its shut-off position. In the normal mode, the fall-back level is furthermore deactivated, for which purpose safety valve 40 is switched to its throughflow position and connects the two hydraulic lines 38 and 39 to one another. This communicating connection between the so-called "left-hand hydraulic rod" (hydraulic line 38, chamber 36, chamber 24) and the so-called "right-hand hydraulic rod" (hydraulic line 39, chamber 37 and chamber 25) is necessary where the steer-by-wire level operates with a variable steering-angle transmission ratio.

Because the positive coupling of the steering handle 3 to the steered vehicle wheels 6 at the fall-back level has a constant steering-angle transmission ratio, a differential pressure can build up between the left-hand hydraulic rod (38, 36, 24) and the right-hand hydraulic rod (39, 37, 25) when a different steering-angle transmission ratio is operative on the fall-back level to that on the steer-by-wire level as part of variable steering-angle transmission. To prevent the formation of such a differential pressure, which would lock the steering in an extreme case, the hydraulic coupling of the left-hand hydraulic rod (38, 36, 24) to the right-hand hydraulic rod (39, 37, 25) via the safety valve 40 is provided.

In normal operation, a pressure difference is formed between the chambers 14, 15 by the control valve 7. This pressure difference leads to a corresponding axial displacement of the piston rod 17 and brings about a corresponding actuation of the steered vehicle wheels 6. Due to the hydraulic coupling of the chambers 24, 25 via the safety valve 40, no differential pressure can build up between these chambers 24, 25, and the emergency level thus does not affect the steer-by-wire level.

If the steering system of the steer-by-wire level detects a fault, it is possible to switch to the emergency mode, i.e. to operation of the steering system on the fall-back level. For this purpose, the safety valves 26, 40 are switched to the position shown in FIG. 1. There is no need for an active switching signal for this purpose because these positions are adopted automatically by the safety valves 26, 40 when the switching current is switched off.

In emergency mode, a steering movement of the steering handle 3 is converted into an axial displacement of the piston 33 in the manual-side piston-cylinder unit 32. This axial displacement of the piston 33 causes a reduction in volume in one of the two chambers 36 or 37, this being associated with a corresponding displacement of hydraulic fluid. The hydraulic fluid displaced brings about an enlargement in volume in the respectively associated chamber 24 or 25 of the wheel-side piston-cylinder unit 16, this being associated with an axial displacement of the piston rod 17, as a result of which the steered vehicle wheels 6 are actuated. In this emergency mode, the chambers 14, 15 are hydraulically coupled via safety valve 26. As a result, the axial displacements of the piston rod 17 cannot lead to the formation of differential pressures between the chambers 14, 15.

The simulation of a manual torque at the steering handle in normal mode, which occurs when the steered vehicle wheels 6 reach a steering angle assigned to a steering stop, operates as follows. In normal mode, the safety valve 26 is in its shut-off position and the safety valve 40 is in its throughflow position. If a steering actuation of the steering handle 3 leads to the steered vehicle wheels 6 reaching their maximum steering lock or steering angle, a control unit of the steering system switches safety valve 40 into its shut-off position and thereby decouples the left-hand hydraulic rod (38, 36, 24) from the right-hand hydraulic rod (39, 37, 25). Switching the safety valve 40 into the position shown in FIG. 1 activates the fall-back level. The switching point for the displacement of the safety valve 40 can be specified, for example, as a function of the actual steering angle detected by the actual steering-angle transmitter. Provision may be made to switch the safety valve 40 into its shut-off position at a steering angle which is smaller than the maximum possible steering angle in order in this way to form a transition zone.

If the steered vehicle wheels 6 or their steering linkage 5 then reach the steering stop predetermined by the steering kinematics or by a specific stop, further actuation of the steering handle 3 and of the positively coupled system for the axial displacement of the piston 33 of the manual-side piston-cylinder unit 32 results in a pressure rise in the respectively affected hydraulic rod due to the fact that the piston rod 17 can no longer be displaced at the steering stop. In this way, the forces prevailing on the steering linkage 5 at the steering stop are transmitted directly to the steering handle 3. In other words, the steering handle 3 cannot be actuated further.

The operation of the method according to the invention by way of which a manual torque representing a steering stop is achieved at the steering handle does not depend upon whether the steer-by-wire level remains active or is deactivated, by switching the safety valve 26 into its throughflow position, when the fall-back level is activated, i.e. when the safety valve 40 is switched to its shut-off position.

Although the sole FIGURE shows a steering system with a hydraulically operating steer-by-wire level and with a hydraulically operating fall-back level, the method according to the invention can be employed for steering systems of any desired configuration, in which the steer-by-wire level and/or fall-back level are of different configurations. The only important point is that there should be a positive coupling between the steering handle 3 and the steered vehicle wheels 6 on the fall-back level. For example, the fall-back level could have a conventional steering train which is activatable or deactivatable by a clutch arranged therein between the steering handle and the steered vehicle wheels.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a vehicle steering system, comprising (a) operating a steer-by-wire level constituting a normal mode in which a steering handle is connected to steered vehicle wheels via an electric or electronic control system (b) switching from the normal mode to a fall-back level constituting an emergency mode in which the steering handle is positively coupled to the steered vehicle wheels, and (c) activating the fall-back level even in normal mode operation of step (a) if the steered vehicle wheels are displaced into the region of a steering stop.

2. The method according to claim 1, wherein the fall-back level is added to the steer-by-wire level in step (c).

3. The method according to claim 1, wherein a switch is made from the steer-by-wire level in step (a) to the fall-back level in step (b).

4. The method according to claim 1, wherein the fall-back level is deactivated as soon as the steering handle is no longer being actuated or as soon as the steering handle is actuated in a direction which takes the steered vehicle wheels away from the steering stop.

5. The method according to claim 4, wherein the fall-back level is added to the steer-by-wire level in step (c).

6. The method according to claim 5, wherein a switch is made from the steer-by-wire level in step (a) to the fall-back level in step (b).

7. The method according to claim 1, further comprising the step of forming a variable steering-angle transmission system on the steer-by-wire level, in which the actuation of the steered vehicle wheels brought about by the actuation of the steering handle depends on at least one vehicle operating parameter.

8. The method according to claim 7, wherein the fall-back level is added to the steer-by-wire level in step (c).

9. The method according to claim 8, wherein a switch is made from the steer-by-wire level in step (a) to the fall-back level in step (b).

10. The method according to claim 9, wherein the fall-back level is deactivated as soon as the steering handle is no longer being actuated or as soon as the steering handle is actuated in a direction which takes the steered vehicle wheels away from the steering stop.

11. The method according to claim 1, wherein during the activation of the fall-back level in normal mode, a manual-torque actuator used to simulate at the steering handle side forces acting on the steered vehicle wheels is unactuated or its moment or power consumption is reduced.

12. The method according to claim 11, wherein the fall-back level is added to the steer-by-wire level in step (c).

13. The method according to claim 12, wherein a switch is made from the steer-by-wire level in step (a) to the fall-back level in step (b).

14. The method according to claim 13, wherein the fall-back level is deactivated as soon as the steering handle is no longer being actuated or as soon as the steering handle is actuated in a direction which takes the steered vehicle wheels away from the steering stop.

15. The method according to claim 14, further comprising the step of forming a variable steering-angle transmission system on the steer-by-wire level, in which the actuation of the steered vehicle wheels brought about by the actuation of the steering handle depends on at least one vehicle operating parameter.

* * * * *